US 6,665,500 B2

(12) United States Patent
Snawerdt

(10) Patent No.: US 6,665,500 B2
(45) Date of Patent: Dec. 16, 2003

(54) DUAL-MODE FIBER OPTIC TELECOMMUNICATIONS SYSTEM AND METHOD

(75) Inventor: Peter Snawerdt, Melbourne Beach, FL (US)

(73) Assignee: Oyster Optics, Inc., New York, NY (US)

( * ) Notice: Subject to any disclaimer, the term of this patent is extended or adjusted under 35 U.S.C. 154(b) by 344 days.

(21) Appl. No.: 09/772,018

(22) Filed: Jan. 29, 2001

(65) Prior Publication Data
US 2002/0101640 A1 Aug. 1, 2002

(51) Int. Cl.[7] .............................................. H04B 10/04
(52) U.S. Cl. ...................... 398/185; 398/186; 398/188
(58) Field of Search ................. 559/180, 181, 559/182, 183, 184, 185, 186, 187, 188, 110; 398/185, 186, 188, 202, 203, 204

(56) References Cited

U.S. PATENT DOCUMENTS

| | | | |
|---|---|---|---|
| 4,754,452 A | 6/1988 | Henry | 370/85 |
| 4,824,201 A | 4/1989 | Kazovsky | 380/96.16 |
| 5,223,967 A | 6/1993 | Udd | 359/119 |
| 5,239,306 A | 8/1993 | Siwiak et al. | 340/825.44 |
| 5,291,516 A | 3/1994 | Dixon et al. | 375/1 |
| 5,319,438 A | 6/1994 | Kiasaleh | 356/345 |
| 5,455,698 A | 10/1995 | Udd | 359/119 |
| 5,483,370 A * | 1/1996 | Takahashi | 359/128 |
| 5,543,952 A | 8/1996 | Yonenaga et al. | 359/181 |
| 5,577,087 A | 11/1996 | Furuya | 375/377 |
| 5,606,446 A | 2/1997 | Davis et al. | 359/173 |
| 5,625,479 A | 4/1997 | Suzuki et al. | 359/135 |
| 5,726,784 A | 3/1998 | Alexander et al. | 359/125 |
| 5,757,912 A | 5/1998 | Blow | 380/21 |
| 5,793,512 A | 8/1998 | Ryu | 359/179 |
| 5,822,102 A | 10/1998 | Bodeep et al. | 359/167 |
| 5,896,211 A | 4/1999 | Watanabe | 359/124 |
| 5,920,416 A | 7/1999 | Beylat et al. | 359/181 |
| 5,940,452 A | 8/1999 | Rich | 375/347 |
| 5,946,119 A | 8/1999 | Bergano et al. | 359/124 |
| 5,953,139 A | 9/1999 | Nemecek et al. | 359/124 |
| 5,953,421 A | 9/1999 | Townsend | 380/21 |
| RE36,430 E | 12/1999 | Halbert-Lassalle et al. | 370/204 |
| 6,072,615 A | 6/2000 | Mamyshev | 359/183 |
| 6,097,525 A | 8/2000 | Ono et al. | 359/181 |
| 6,122,086 A | 9/2000 | Djupsjoebacka | 359/181 |
| 6,124,960 A | 9/2000 | Garthe et al. | 359/181 |
| 6,215,565 B1 * | 4/2001 | Davis et al. | 359/110 |
| 6,243,505 B1 | 6/2001 | Bosso et al. | 385/2 |
| 6,256,130 B1 | 7/2001 | Bülow | 359/173 |

FOREIGN PATENT DOCUMENTS

| | | |
|---|---|---|
| EP | 0977382 | 2/2000 |
| JP | 06053904 | 2/1994 |

* cited by examiner

Primary Examiner—Leslie Pascal
Assistant Examiner—Christina Y Leung
(74) Attorney, Agent, or Firm—Davidson, Davidson & Kappel, LLC

(57) ABSTRACT

An optical data transmitter includes at least one light source, a phase modulator for phase modulating light from the light source, and a controller having an input for receiving an electronic data stream, the controller in a first mode controlling the phase modulator so as to create phase-modulated optical signals in the light as a function of the electronic data stream and the controller in a second alternate mode amplitude-modulating the light as a function of the electronic data stream. A dual-mode receiver, an optical data transmission system and a dual-mode optical signal are also disclosed.

19 Claims, 2 Drawing Sheets

DUAL-MODE FIBER OPTIC TELECOMMUNICATIONS SYSTEM AND METHOD

BACKGROUND OF THE INVENTION

1. Field of the Invention

The present invention relates generally to telecommunications and more particularly to transmitters and receivers for fiber optic networks.

2. Background Information

In current fiber optic networks, an electronic data stream is fed to a laser amplitude modulator. The laser amplitude modulator typically pulses or alters the laser output to create an amplitude-modulated optical signal representative of the electronic data stream. The laser amplitude modulator and laser thus define a transmitter for transmitting the optical signal over an optical fiber, which is then received by a receiver. The receiver for the amplitude-modulated optical signals of the optical data typically includes a photodiode to convert the optical signals back into the electronic data stream.

The reading of the amplitude-modulated optical data signals using a photodiode is straightforward: the optical signals either produce an electric output at the photodiode or they do not. As a result, an output electronic data stream of zeros and ones is generated.

However, optical fiber may be tapped. The optical fibers can be spliced or even merely clamped so as to obtain optical signals from the fiber. It also may be possible to tap fibers without physically touching the optical fiber, for example by reading energy emanating or dissipating along the fiber. Amplitude-modulated optical signals, with their ease of detection from a photodiode, require that only a small amount of energy be tapped and passed through the photodiode in order to be converted into a tapped electronic data stream.

To confront non-secure optical and non-optical data lines, it has been known to use public key/private key encryption so that the data stream being transmitted is encoded in a format that makes it difficult to decode. Encryption however has several drawbacks, including the need for extra processing steps and time. Moreover, public key/private key encrypted data can be cracked, and the devices and algorithms for doing so are constantly improving.

U.S. Pat. No. 5,455,698 purports to disclose a secure fiber optic communications system based on the principles of a Sagnac interferometer. A data transmitter is a phase modulator for modulating counter-propagating light beams sent by a receiver round a loop. The receiver includes a light source, a beamsplitter for splitting light from the light source into counter-propagating light beams and for receiving the phase-modulated light beams, and an output detector. U.S. Pat. No. 5,223,967 describes a similar Sagnac-interferometer-based system operating over a single optical fiber.

The Sagnac-interferometer-based systems described in these patents have the disadvantage that they require the light to travel over a loop, whether back and forth in a single fiber or over a long length looped fiber. As a result, either the link budget for the single fiber must be doubled or else a looped fiber with significant and expensive extra length of at least twice that of a single fiber must be laid between the transmitter and the receiver. Moreover, the receiver contains the light source, as opposed to the current installed base where the transmitter has the light source.

The Sagnac-interferometer-based systems thus are expensive to build and operate, and do not work particularly well with existing systems.

U.S. Pat. No. 6,072,615 purports to describe a method for generating a return-to-zero optical pulses using a phase modulator and optical filter. The RZ-pulse optical signal transmitted over the fiber is easily readable by a detector.

U.S. Pat. No. 5,606,446 purports to describe an optical telecommunications system employing multiple phase-compensated optical signals. Multiple interferometric systems are combined for the purpose of multiplexing various payloads on the same optical transmission path. The patent attempts to describe a method for providing fiber usage diversity using optical coherence length properties and a complex transmit/receive system. Each transmitter has a splitter, a plurality of fibers and a plurality of phase modulators to create the multiplexed signal, which is then demultiplexed at the receiver. This system is complex and expensive.

The phase-modulated based systems described above moreover are not compatible with existing receivers, a major disadvantage.

SUMMARY OF THE PRESENT INVENTION

An object of the present invention is to provide a transmitter for transmitting either phase-modulated or amplitude-modulated optical signals. An alternate or additional object of the present invention is to provide a receiver for receiving either phase-modulated or amplitude-modulated optical signals.

The present invention provides a transmitter having at least one light source, a phase modulator for phase modulating light from the light source, and a controller having an input for receiving an electronic data stream, the controller in a first mode controlling the phase modulator so as to create phase-modulated optical signals in the light as a function of the electronic data stream and the controller in a second alternate mode amplitude-modulating the light as a function of the electronic data stream.

The present invention thus permits a phase-modulated transmission mode or an amplitude-modulated transmission mode, or both a phase and amplitude modulated transmission mode, which can permit the transmitter to work with different types of receivers. An optical fiber typically connects the transmitter of the present invention to the receiver.

The controller in the first mode preferably phase-modulates the light as a function of an output of a delayed-feedback exclusive-or gate having the electronic data stream as an input. The first mode is thus a highly secure data transmission mode, as described in co-owned and co-pending U.S. patent application Ser. No. 09/765,153, entitled "Secure Fiber Optics Telecommunications System and Method" and filed on Jan. 17, 2001, the entire disclosure of which is hereby incorporated by reference herein.

In the second mode, the light may be amplitude modulated either by altering the energy provided to the light source or by altering the light emitted by the light source. The light source preferably is a laser, for example a semiconductor laser operating at a 1550 nm, or other, wavelength.

In the second mode, the light may be amplitude modulated either in direct relation to an input data stream (known as the direct second or amplitude-modulated mode), or as a function of an output of a delayed-feedback exclusive-or gate having the electronic data stream as an input (known as the delayed second or amplitude-modulated mode). In the delayed second mode, the optical signal may or may not also be phase modulated. In the direct second mode, the amplitude-modulated optical signals sent by the transmitter can be read common receivers, or by the receiver of the present invention. In the delayed second mode, the amplitude-modulated optical signals can be read by the receiver of the present invention as well as by the receiver of incorporated-by-reference U.S. patent application Ser. No. 09/765,153, entitled "Secure Fiber Optics Telecommunications System and Method" and filed on Jan. 17, 2001.

The controller preferably has two circuits, a first circuit for controlling the phase modulation and a second circuit controlling the amplitude modulation. Preferably, a switch, which may be composed of hardware or software, is provided to activate the first mode, the delayed second mode, or the direct second mode. An operator may set the switch of a first transmitter to the first mode, the delayed second mode, or the direct second mode, so that the transmitter generally always operates in that mode.

Alternately, the switch can be controlled by bit data in a packet of a packet-based data input stream. The bit data may be set for example to zero or one or two or three, so that the data contained in the packet is sent either via the first mode or via the direct second mode or the delayed second mode with no phase modulation or the delayed second mode with phase modulation as a function of the bit data. The transmitter thus produces an alternating amplitude-modulated and phase-modulated data stream, which can be read by a receiver of the present invention. The packets preferably contain data regarding the transmission mode for the next packet so as to permit the receiver to have time to switch between alternate receive modes.

Both the operator-set and packet-switched systems have the advantage that telecommunications providers can provide customers differentiated services, for example a secure mode and a non-secure mode, although the bit-based method provides carriers more options for devising service levels.

The at least one light source may include two lasers, a first laser for the amplitude-modulated signals, and a second laser for the phase-modulated signals. A coupler couples the light from the two lasers together. Preferably, however, a single laser directly next to the phase-modulator is provided. This prevents delay between the laser and the phase-modulator when modes are switched.

The present invention also provides a receiver for receiving optical signals, the optical signals including both phase-modulated optical signals and direct amplitude-modulated optical signals. The receiver includes an interferometer for reading the phase-modulated signals and a detector to read the direct amplitude-modulated optical signals.

The receiver also may read delayed amplitude-modulated optical signals through the interferometer.

Preferably, an energy level detector is also provided at the receiver for measuring light energy in a fiber.

Preferably, the second light path has a delay with respect to the first light path, the delay being matched to a delay at the transmitter during the phase-modulated transmission mode and the delayed second amplitude-modulated mode.

The receiver can read a mixed optical signal of both phase-modulated and direct and delayed amplitude-modulated signals, with the direct amplitude-modulated signals being read off the third path.

The receiver can be set by an operator to receive in one of the three modes, or can be switched to the various receive modes by a bit set in a packet. For example, the current packet being received sets the receiver to the proper receive mode for the next packet.

The present invention also provides a dual-mode optical transmission system comprising a transmitter for transmitting amplitude-modulated signals in a first mode and phase-modulated signals in a second mode, an optical fiber connected to the transmitter, and a receiver having an interferometer being connected to the optical fiber. The first and second mode signals can be read by the receiver, and can be switched based on either an operator input or packet-based data.

The present invention also provides a method for transmitting optical data in two modes comprising the steps of:

phase modulating light from at least one light source during a first transmission mode so as to transmit phase-modulated optical data; and amplitude modulating light from the at least one light source during a second alternate transmission mode so as to transmit amplitude-modulated optical data.

Preferably, the at least one light source is a single laser.

The amplitude modulating step may include amplitude modulating the light as a direct function of an input electronic data stream, or as a function of an output of a delayed-feedback exclusive-or gate.

The method may further include switching between the phase modulating and the amplitude modulating steps as a function of a packet bit set.

Also provided by the present invention is an optical signal comprising amplitude-modulated signals representative of an input data stream during a first time period and phase-modulated signals representative of the input data stream during a second time period subsequent or prior to the first time period.

It should be understood however that, while phase-modulated signals are preferred in the secure transmission mode, under certain circumstances a mixture of phase and amplitude modulation could be possible. For example, amplitude modulated signals not related to the input optical data stream could be transmitted during the secure phase-modulation mode without necessarily affecting security.

BRIEF DESCRIPTION OF THE DRAWINGS

Two preferred embodiments of the present invention are described below by reference to the following drawings, in which.

DETAILED DESCRIPTION

Figure 1:
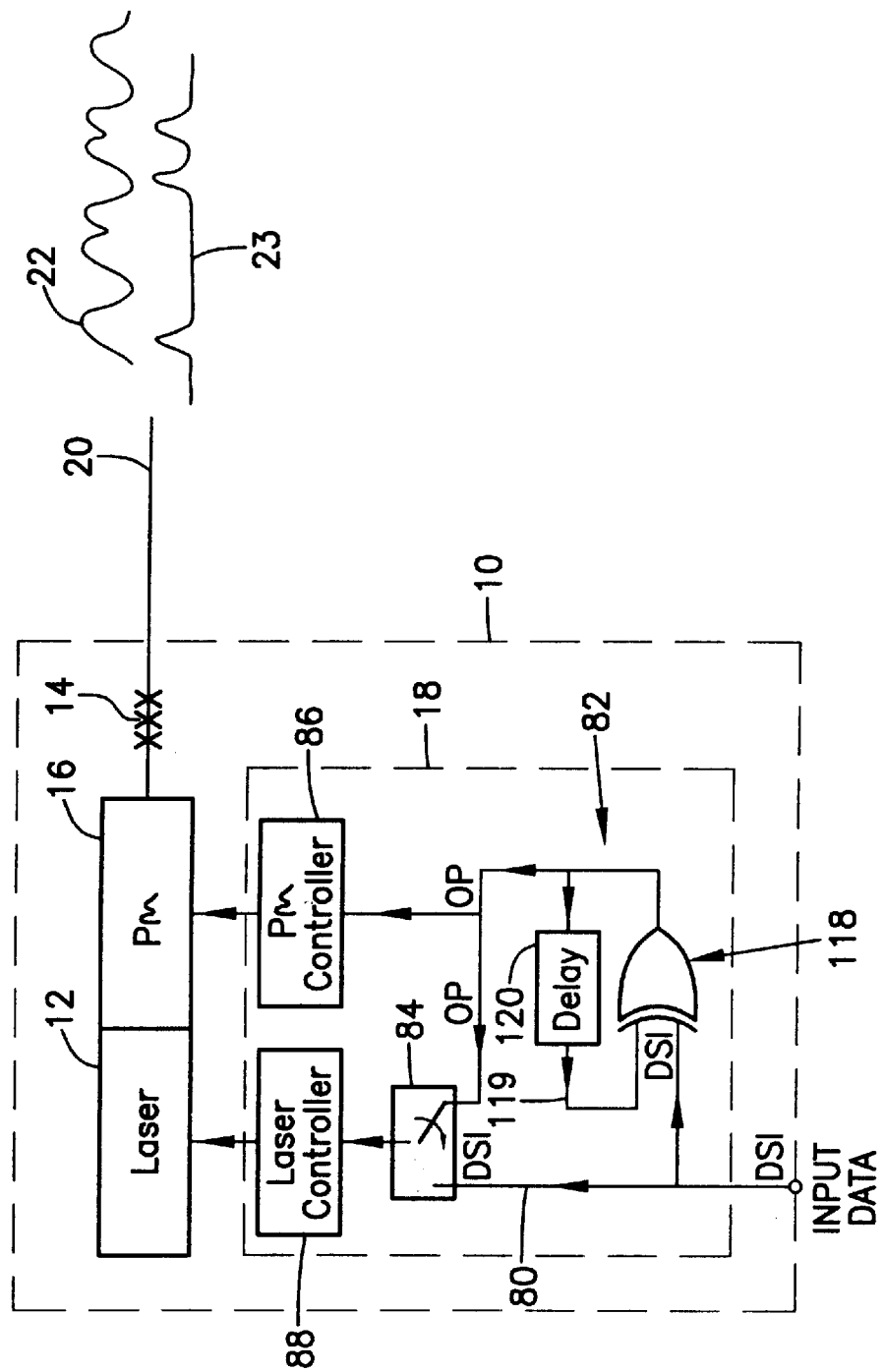
FIG. 1 shows a preferred embodiment of a transmitter of the present invention.

FIG. 1 shows a preferred embodiment of a dual-mode transmitter 10 according to the present invention for transmitting signals to an optical fiber 20. Transmitter 10 includes a single laser 12, for example a semiconductor laser emitting a narrow band of light at approximately 1550 nm, or at other wavelengths. Light emitted from laser 12 passes through a phase modulator 16, for example a Mach-Zender phase modulator, directly next to or part of the same package as laser 12. The light may be depolarized by a depolarizer 14. An electronic controller 18, for example a PLC, controls phase modulator 16 and the amplitude of the light output of laser 12, for example through pulsing the laser.

Controller 18 directs the input data DSI to a direct amplitude modulation circuit 80 and to a circuit 82 having a delayed-feedback exclusive-or gate 118. Input data DSI forms one input of exclusive-or gate 118. The other input of the delayed-feedback exclusive-or gate 118 is a feedback loop 119, which feeds back the output of exclusive-or gate 118, and has an electronic delay circuit 120, which causes a delay, for example, a certain number of bits later. Delayed-feedback exclusive-or gate 118 outputs the output electronic data stream OP. The data OP exiting circuit 82 is directed both to a switch 84 and a phase modulator controller 86. Direct circuit 80 also supplies an input with data DSI to switch 84.

The output of switch 84 is directed to an amplitude controller 88 for laser 12, which during an amplitude modulation mode is modulated according to the output from switch 84. Amplitude controller 88, during an amplitude-modulation mode, thus amplitude modulates the laser 12 so that an amplitude-modulated signal 23, representative of either the data DSI or OP, passes to fiber 20.

During an amplitude modulation mode, phase modulator controller 86 either does not phase modulate the light, or phase modulates based upon the output of the delayed feedback exclusive-or circuit 82.

When switch 84 receives data from circuit 82, the laser amplitude is a function of the output OP of the delayed-feedback exclusive-or gate 118. The transmitter 10 thus transmits in a delayed-feedback exclusive-or amplitude-modulated mode, defined herein as the delayed amplitude-modulated mode. When switch 84 receives data DSI from direct circuit 80, the laser amplitude is a direct function of the input electronic data DSI. The transmitter 10 thus transmits in the direct amplitude-modulated mode.

During the alternate phase-modulation mode, the amplitude controller 88 directs the laser to emit constant wavelength, non-pulsed light. Depending on the output OP of circuit 82, phase modulator 16 then either imparts a known initial phase shift to the light which could be 0 degrees or else imparts another known offset phase shift preferably equal to the known initial phase shift+180 degrees on the light passing through phase modulator 16. An optical signal 22, which represents a stream of binary bits, is thus created. Optical signal 22 is transmitted over fiber 20. This signal provides a secure data transmission mode. The phase-modulated signal must be read with an interferometer having a proper delay path, and any tap to obtain enough light to read the phase-modulated signal is easily detectable.

In the direct amplitude modulated mode, a standard receiver can read the signals 23.

In the delayed amplitude modulated mode, signals OP are sent in a pulsed fashion. These signals can be read by the receiver disclosed in incorporated-by-reference U.S. patent application Ser. No. 09/765,153, entitled "Secure Fiber Optics Telecommunications System and Method" and filed on Jan. 17, 2001. A standard receiver with a photodiode also could read the delayed amplitude modulated signals. The photodiode output could then be split into two legs, with one leg having a delay, which must be similar to the delay 120 in the delayed-feedback exclusive-or gate 118. The two legs are then passed through an exclusive-or gate to obtain the proper signal DSI.

In the phase-modulated mode, the phase-modulated signals 22 can read by the receiver disclosed in incorporated-by reference U.S. patent application Ser. No. 09/765,153, entitled "Secure Fiber Optics Telecommunications System and Method" and filed on Jan. 17, 2001. The signals 22 pass through a splitter, with one path having an optical delay similar to the delay 120. The light recombines in a coupler so that input stream DSI can be reconstituted.

Figure 2:
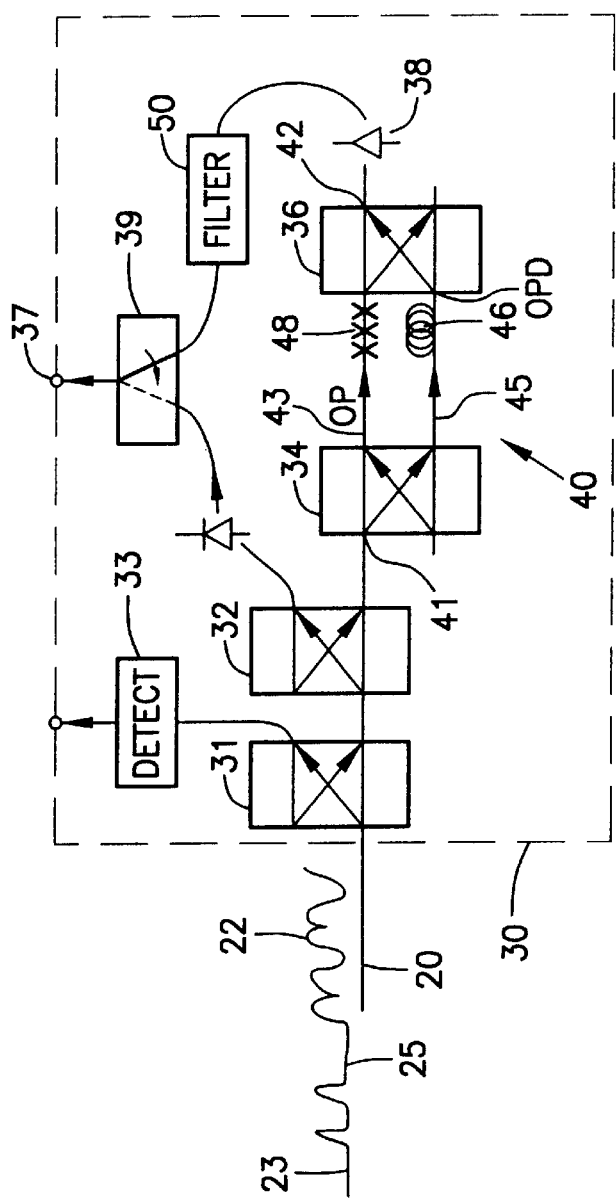
FIG. 2 shows a preferred embodiment of a receiver of the present invention.

Receiver 10 shown in FIG. 2 is a preferred embodiment permitting three modes. However, the present invention also encompasses a transmitter with the phase-modulated mode and only one of the direct and delayed amplitude-modulated modes. A transmitter with the phase-modulated mode and the direct amplitude-modulated mode only, for example, is backwards-compatible with existing receivers in the amplitude-modulated mode and yet can provide a secure and non-secure mode with receivers having an interferometer as disclosed herein. A transmitter with the phase-modulated mode and the delayed amplitude-modulated mode only provides secure and non-secure modes and is compatible for both modes with the receiver disclosed in U.S. patent application Ser. No. 09/765,153, entitled "Secure Fiber Optics Telecommunications System and Method" and filed on Jan. 17, 2001.

The present invention also provides a receiver compatible with existing transmitters, with the transmitter disclosed in U.S. patent application Ser. No. 09/765,153, entitled "Secure Fiber Optics Telecommunications System and Method" and filed on Jan. 17, 2001, and with the transmitter of the present invention.

As shown in FIG. 2, receiver 30 can receive either direct or delayed amplitude-modulated signals as well as phase-modulated signals. Receiver 30 includes a coupler/splitter 31, functioning as a splitter. Splitter 31 splits off a portion of the light, directing part of the optical energy to an energy level or tap detector 33 and passes the remaining light to a second coupler/splitter 32.

Splitter 32 splits light to a photodiode 35 for converting amplitude-modulated optical signals into electrical signals. The receiver also has an interferometer 40 receiving the rest of the light from splitter 32. The interferometer 40 has a coupler/splitter 34, functioning as a splitter, and a coupler/splitter 36, functioning as a coupler.

Detector 33 monitors, during the phase-modulation transmission mode, the light energy in the fiber 20 via the light energy coupled to the detector by splitter 31. If the amplitude drops during this mode, most likely from a tap, the detector alerts the receiver and can, for example, sound an alarm or alert network maintenance personnel. Additionally, since the receiver is generally part of a component box, which also includes a transmitter, the component box transmitter can send a signal back to the component box containing transmitter 10 so as to instruct transmitter 10 to stop sending data, or to send data over a standby fiber. During an amplitude-modulation transmission mode, the detector 33 can be set to a different trip level.

Optical signals 22, 23 in fiber 20, after passing splitter 31 and splitter 32, enter interferometer 40 at an input 41 of splitter 34. Splitter 34 splits the light entering input 41, so that the signals 22, 23 travel over both a first fiber 43 and a second fiber 45. A depolarizer 48 may depolarize light passing through fiber 43, preferably, or fiber 45 as an alternative. Second fiber 45 includes a delay fiber 46 which may include a fiber loop of a desired length. Delay fiber 46 then provides an input to coupler 36 which recombines the delayed signal with the non-delayed signal propagating through fiber 43 and depolarizer 48 at output 42. The physical delay imposed by the interferometer 40 in the second light path through fiber 45, with its delay loop 46, with respect to light passing through the first light path through fiber 43 and depolarizer 48 is selected to match as closely as possible an electronic delay time imposed by electronic delay circuit 120 of the controller 18. If the first path in the interferometer 40 has a length L1 and the second path a length L2, the length L2 is selected, preferably by sizing loop 46, as a function of L1, the speed of light v in fibers 43 and 45, the light propagation delay through the depolarizer 48, DPD, and the electronic delay time ED. The speed of light in the fibers may be estimated as a function of the wavelength and the type of fiber used. The length L1 is known. When depolarizer 48 is in path 43, L2 is then chosen to approximate, and preferably equal, the amount (ED+DPD)*v+L1.

The phase-modulated signals 22 recombining at output 42 thus recombine the signal OP with a delayed signal OPD, delayed by an amount of time equivalent to the electronic delay time ED. If the data in the OP and OPD signals each represents a zero, or each represents a one, at the inputs 44 and 47 to coupler 36, the signals 22 will destructively interfere when recombined at output 42 of coupler 36. Output detector 38 then detects no light and a produces a zero signal. If one of the data bits in the OP and OPD signals represents a zero and the other one represents a one, at the inputs 44 and 47 to coupler 36, the signals will constructively interfere when recombined at coupler output 42. This is true for both phase-modulated and amplitude-modulated signals. Output detector 38 then detects light and produces an electronic signal representative of a one. When receiving phase-modulated signals or the delayed amplitude-modulated signals, detector 38 thus outputs the input data stream DSI. A filter 50 can be provided to filter out noise or other minor inaccuracies in the recombination of the signals. This stream is transmitted via a switch 39 to output 37.

The interferometer 40 comprising coupler/splitter 34 and 36, fibers 43 and 45, delay fiber 46, and depolarizer 48 functions as an optical exclusive-or gate with one input leg delayed for signals arriving at input 41 of coupler 34. Interferometer 40 as a whole thus optically and physically "decodes" the signal OP produced by the delayed-feedback exclusive-or gate 118.

When receiving direct amplitude modulated signals, the detector outputs a signal that is meaningless. Switch 39 is thus set to receive an input from photodiode 35, which is representative of stream DSI, and thus stream DSI is sent to output 37.

The receiver of the present invention thus can receive both direct amplitude-modulated signals and phase-modulated signals. The receiver 30 also could include a circuit after photodiode 35 so as to convert the delayed amplitude-modulated signals to the stream DSI. In this case, the output detector 38 would only be used to read the phase-modulated signals.

Controlling of the change between secure mode and the amplitude-modulated modes can function in a variety of ways, depending on the overall system configuration. With the transmitter 10 and the receiver 30, an operator can configure the transmitter 10 and receiver 30 so that the system functions in any of the three modes.

If the system includes a dual-mode transmitter (defined herein as a transmitter with a phase-modulation mode and one or more amplitude-modulation modes), an input packet data bit also could be used to set the mode.

Signal 25 in FIG. 2 is shown as a combination of amplitude-modulated signals 23 and phase-modulated signals 22, which occurs for example when packets with different modes are sent one after another.

Figure 3:
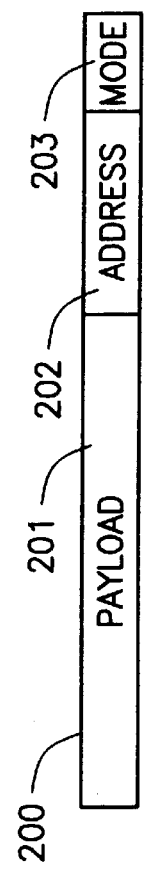
FIG. 3 shows details a packet for possible use with the transmitter of the present invention

FIG. 3 shows an example of such a packet 200 having a data payload 201, and address 202, and mode data 203. Depending on the mode data, the transmitter transmits in a phase-modulated or amplitude-modulated mode. If the transmitter is similar to transmitter 30, the mode data further includes whether to amplitude-modulate in direct or delayed mode. Preferably, the mode data 203 is set not for its own packet N, but for the following packet N+1, thus providing a buffer time for the receiver to change modes. Thus, when packet N+1 is received, the receiver is set to the proper receive mode. The mode data could also be set more than one packet ahead, for example N+2.

If both a dual mode transmitter and a dual mode receiver are used in a system, a telecommunications service provider thus could charge certain customers for an enhanced secure mode service for their packet-based data, while permitting other customers to send data in a non-secure mode in their packets.

An alternate embodiment of the transmitter of the present invention can include two lasers, with the first laser being controlled during the amplitude modulation modes. The second laser is a continuous wave laser modulated by a phase modulator in the alternate secure mode. A coupler couples the light from the first laser and second lasers together, so that the optical signal for either mode travels over a single fiber.

What is claimed is:

1. An optical data transmitter comprising:

a laser;

a phase modulator for phase modulating light from the light source; and a controller having an input for receiving an electronic data stream, the controller in a first mode controlling the phase modulator so as to create phase-modulated optical signals in the light from the laser as a function of the electronic data stream and the controller in a second alternate mode amplitude-modulating the light from the laser as a function of the electronic data stream, the first mode and the second mode occurring at different times.

2. The transmitter as recited in claim 1 wherein the controller in the second mode amplitude modulates the light in direct relation to the input data stream.

3. The transmitter as recited in claim 1 wherein the controller in the second mode amplitude modulates the light as a function of an output of a delayed-feedback exclusive-or gate having the electronic data stream as an input.

4. The transmitter as recited in claim 1 wherein the controller has a switch for switching between the first and second modes.

5. The transmitter as recited in claim 4 wherein the switch is operator-activated.

6. The transmitter as recited in claim 1 wherein the switch is bit-data activated.

7. The transmitter as recited in claim 6 wherein bit data contained in a packet activates the switch.

8. The transmitter as recited in claim 1 wherein the laser is directly adjacent the phase-modulator.

9. The transmitter as recited in claim 1 wherein during the second mode the phase-modulator provides a constant or no phase-modulation change.

10. An optical data transmitter comprising:

a light source;

a phase modulator for phase modulating light from the light source; and a controller having an input for receiving an electronic data stream, the controller in a first mode controlling the phase modulator so as to create phase-modulated optical signals in the light from the light source as a function of the electronic data stream and the controller in a second alternate mode amplitude-modulating the light from the light source as a function of the electronic data stream; wherein the controller in the first mode preferably phase-modulates the light as a function of an output of a delayed-feedback exclusive-or gate having the electronic data stream as an input.

11. A receiver for receiving optical signals, the optical signals including both phase-modulated optical signals and direct amplitude-modulated optical signals, the receiver comprising:

an interferometer for reading the phase-modulated signals; and a detector to read the direct amplitude-modulated optical signals;

wherein the interferometer receives delayed amplitude-modulated optical signals.

12. The receiver as recited in claim 11 further comprising a switch for switching between an output of the interferometer and another output of the detector.

13. The receiver as recited in claim 12 wherein the switch is operator-controlled.

14. The receiver as recited in claim 12 wherein the switch is bit-data controlled.

15. The receiver as recited in claim 11 further comprising an energy level detector for measuring light energy in a fiber.

16. A dual-mode optical transmission system comprising:

a transmitter having a laser for transmitting amplitude-modulated signals in a first mode and phase-modulated signals in a second mode and a controller for switching an output of the laser between the first mode and the second mode, the second mode occurring at a different time than the first mode;

an optical fiber connected to the transmitter; and a receiver having an interferometer being connected to the optical fiber.

17. A method for transmitting optical data in two modes comprising the steps of:

phase modulating light from a laser during a first transmission mode so as to transmit phase-modulated optical data; and amplitude modulating light from the laser during a second alternate transmission mode so as to transmit amplitude-modulated optical data, the second alternate transmission mode occurring at a time separate from the first transmission mode.

18. The method as recited in claim 17 wherein during the first transmission mode the light is not amplitude-modulated.

19. The method as recited in claim 17 wherein during the second alternate transmission mode the light is both amplitude-modulated and phase-modulated.

* * * * *